Nov. 3, 1931.  L. L. CHESSMAN  1,829,784
AUTOMOBILE LOCKING MECHANISM
Filed Aug. 29, 1928  3 Sheets-Sheet 1

Fig. 1.

INVENTOR.
Louis L. Chessman
BY
Parsons & Bodell
ATTORNEYS.

Nov. 3, 1931.   L. L. CHESSMAN   1,829,784
AUTOMOBILE LOCKING MECHANISM
Filed Aug. 29, 1928   3 Sheets-Sheet 2

INVENTOR.
Louis L. Chessman.
BY Parsons & Bodell.
ATTORNEYS.

Nov. 3, 1931.  L. L. CHESSMAN  1,829,784
AUTOMOBILE LOCKING MECHANISM
Filed Aug. 29, 1928  3 Sheets-Sheet 3

INVENTOR.
Louis L. Chessman
BY Parsons & Bodell
ATTORNEYS.

Patented Nov. 3, 1931

1,829,784

UNITED STATES PATENT OFFICE

LOUIS L. CHESSMAN, OF SYRACUSE, NEW YORK

AUTOMOBILE LOCKING MECHANISM

Application filed August 29, 1928. Serial No. 302,820.

This invention has for its object, a particularly simple and efficient mechanism for locking up an automobile whereby the starting and ignition switches can not be wired around and the engine tampered with and started when these systems are locked.

The invention consists in the novel features and in the combinations and constructions hereinafter set forth and claimed.

In describing this invention, reference is had to the accompanying drawings in which like characters designate corresponding parts in all the views.

Figure 1 is a fragmentary, horizontal, sectional view of an automobile embodying my invention, unessential parts being removed.

Figure 2:
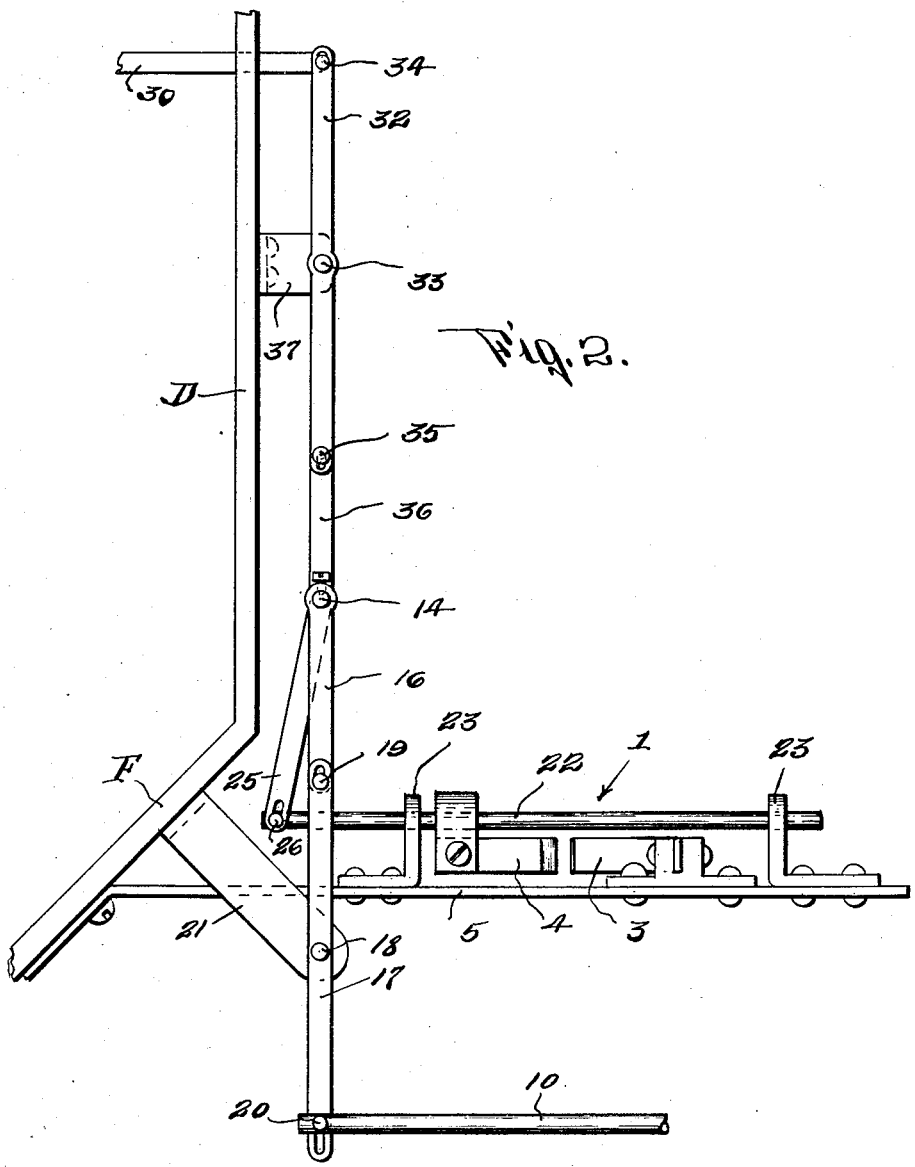
Figure 2 is a fragmentary elevation of parts seen in Figure 1, parts being omitted.
Figure 3:
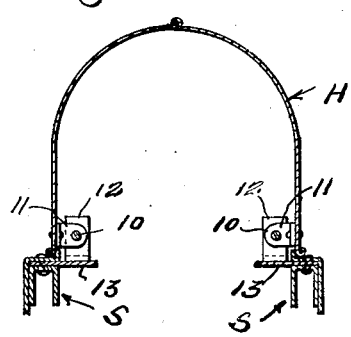
Figure 3 is a vertical sectional view on a reduced scale through a conventional automobile hood and frame, parts being omitted.
Figure 4:
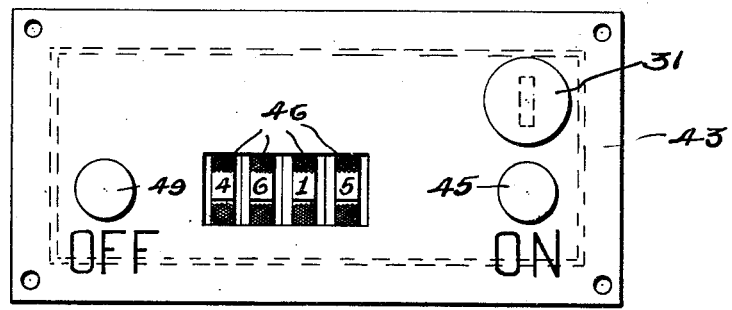
Figure 4 is a front view of the secret lock means for controlling the operation of the locking mechanism.

This invention comprises generally, switches in the starting and ignition circuits of the engine of a motor vehicle, said switches being located under the hood, means for locking the hood closed, the switches being closed when the hood is unlocked and open when the hood is locked and an operating member for unlocking the hood and closing the switches and vice versa, said operating member extending outside of the space under the hood and being usually located or exposed in the instrument board of the vehicle and controlled in its operation by secret means as for instance, a key operated or a combination lock.

The motor vehicle may be of any conventional type including the usual frame or chassis having the sills S, instrument board , dash D, cowl C, hood H and internal combustion engine E having the usual electric starting and ignition circuits, the starting circuit having the usual normally open starting switch operated by the starting lever, button or pedal. The hood H may be of any suitable type including the two sides hinged at their upper edges and movable upwardly on their hinges to make the parts thereof under the hood accessible.

1 designates a switch in the starter circuit, this switch including fixed and movable contacts 3, 4, the fixed contact 3 being mounted upon a suitable plate or bracket 5 located under the head and secured to any convenient part here shown as the inclined floor board F of the vehicle. The movable contact 4 is supported and operated as will be hereinafter described.

6 designates the switch for controlling the ignition circuit or the flow of current to the distributor and eventually to the spark plugs of the engine. This switch also includes fixed and movable contacts 7 and 8, the fixed contact being carried by a suitable plate or bracket 9 at one side of the engine. The movable contact or member 8 of the switch is operated and supported as will be hereinafter described. Both switches 1 and 6 are located under the hood.

The mechanism for locking the opposite sides of the hood comprises locking members as bolts 10 movable into and out of interlocking engagement with locking lugs 11 or other equivalent means provided on the inner faces of the movable sides of the hood near the lower edges thereof, these lugs 11 being provided with perforations through which the locking bolts 10 pass. The bolts 10 are slidable in suitable guides provided in this embodiment of my invention by lugs 12 projecting upwardly from brackets or plates 13 secured to the side sills S. The bracket 9 for the switch 6 is part or an extension of the bracket 13 which supports the bolt 10 on the right hand side of the hood.

The hood locking mechanism also includes a motion transmitting member common to both bolts 10, this member being mounted on the dash D under the hood and is here shown as a rock shaft 14 mounted in suitable brackets 15 on the dash D and connected through suitable motion transmitting connections to the bolts 10. These motion transmitting connections are here shown as a system of levers or links 16 and 17, the levers or links 16 being rock arms mounted on opposite ends of the shaft 14 and extending downwardly therefrom. Each lever 17 is pivoted between its ends at 18 and at 19 and 20 to one of the rock arms 16 and to one of the bolts 10, it being connected to both of these parts by pin and slot connections. The pivots 18 for the levers 17 are carried by suitable brackets 21 secured to any convenient part of the vehicle as the floor board F.

The switches 1 and 6 are also operated from the rock shaft 14 or any part operated or movable with the rock shaft.

In the illustrated embodiment of my invention, the movable contact 4 of the switch 1 is carried by a reciprocating rod 22 movable in suitable guides 23 supported by the plate 5, and the motion transmitting means between the shaft 14 and the sliding switch rod 22 comprises a link or rock arm 25 mounted on the rock shaft 14 and extending downwardly therefrom and pivoted at 26 to the rear end of the rod 22, the pivotal connection being so formed as to permit the reciprocating action of the rod during the swinging movement of the arm 25 in an arc without binding.

As here illustrated, a pin and slot connection is employed. The movable contact or member 8 of the switch 6 is also operated in any suitable manner by the movement of the rock shaft 14. This movable member is also a rod reciprocally movable in guides 27 on the plate or bracket 9 and it is here shown as connected by a bracket or arm 28 to the adjacent locking bolt 10 for one side of the hood.

The common motion transmitting member or rock shaft 14 is operated by a member preferably located on or exposed on the instrument board 1 or any other convenient location outside of the hood.

The operating member here shown is a push and pull rod 30 movable forwardly and rearwardly through the dash D under the cowl C, its forward end extending under the hood, the rod having a suitable handle 31 at its rear end in front of the instrument board. This rod is connected to the shaft 14 to rock the shaft 14 by any suitable motion transmitting connections.

The connections here shown comprise a lever 32 pivoted between its ends at 33, the lever being arranged in vertical position and pivoted at its upper end at 34 to the front end of the rod 30 and its lower end at 35 to an upwardly extending rock arm 36 on the shaft 14. The pivotal points 34 and 35 are loose enough or in the nature of pin and slot connections to permit the operations of the levers 32 and 36 without binding. The pivot 33 of the lever 32 is carried by a suitable bracket 37 on the dash under the hood.

When the hood is locked, the switches 1 and 6 are open so that the engine can not be started and all points where the electrical systems could otherwise be wired around, are rendered inaccessible by the fact that the hood is locked closed.

To start the engine, the rod 30 is pushed inwardly thus rocking the shaft 14 anti-clockwise and through the connections 16 and 17, withdrawing the bolts 10 rearwardly out through the locking lugs 11 on the sides of the hood and this motion of the rock shaft moves the rock arm 25 thereon to the right Figure 2 pushing the switch rod 22 of the switch 1 to the right to bring the movable contact 4 between the fixed contacts 3 thus closing the switch in the starting system so that when the usual starter lever or button is pressed, the circuit is closed through the starting motor. Such movement of the rock shaft 14 also similarly closes the switch 6 of the ignition system as the arm 28 carrying the movable member 8 of the ignition switch is carried by one of the hood locking bolts 10. The reverse of this operation again locks the hood and opens the switches 1 and 6.

The operation of the operating member 30 is controlled by some secret means here shown, as a combination lock. This lock is of the general construction shown in my Patent No. 1,524,815 issued February 3, 1925. This combination lock also controls the electric circuit to the horn or other alarm so that when the hood is locked, the horn can not be sounded or played with.

This lock mechanism comprises a locking bolt 40 movable into and out of a perforation 41 in the operating member or rod 30, a secret lock means for controlling the operation of the bolt 40, this means and the bolt 40 and other parts being located in a suitable case 42 mounted in the instrument board and having a face plate 43 on the face of the instrument board.

This lock mechanism may be of any suitable construction, that here shown being an axially movable rod 44 which is movable axially by a push button 45 in one direction and the rotary tumblers 46 of a combination lock mounted on the rod and serving to lock the rod from axial movement. When the tumblers are all moved to a predetermined position, the rod 44 is shiftable axially by pushing in the push button 45 and this axial movement shifts the bolt 40 to unlock the operating rod 30.

The rod 40 is held in its operated position by any suitable means as an angular arm 47 thereon coacting with a spring pressed latch or detent 48 and this bolt 40 is returned to its normal position by means of a push button 49. The movable contact 50 of a switch connected in the horn circuit is carried b and movable with the bolt 40 and moves into and out of engagement with fixed contacts 51. All the foregoing parts being housed within the case 42.

The push button 45 and the end of the rod 44 have cam means 45$^a$ which coact inclined plane fashion so that pushing in of the push buttons moves the rod 44 to the left when the rod 44 is unlocked by setting the proper combination. The movement of the push button 45 is against a suitable spring 52 as in my patent referred to and after the push button is operated and hence, the bolt operated and latched in its operated position by the arm 44 and detent 48, the rod 44 is free to return to its normal position under the influence of a spring 52 unless it is locked in its retracted position by upsetting the combination.

Figure 5:
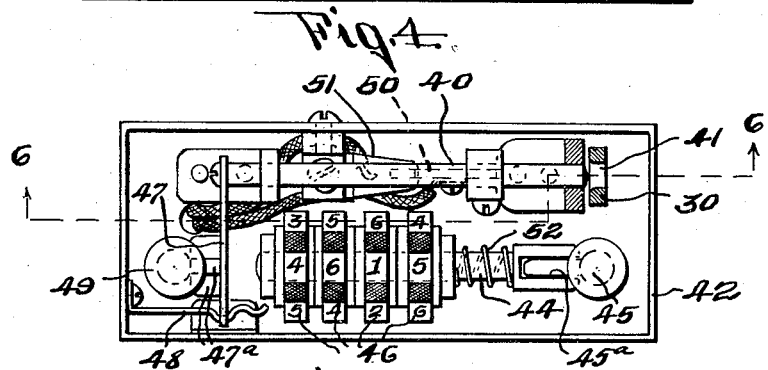
Figure 5 is a front view of parts seen in Figure 4, partly in section, the front plate being removed.
Figure 6:
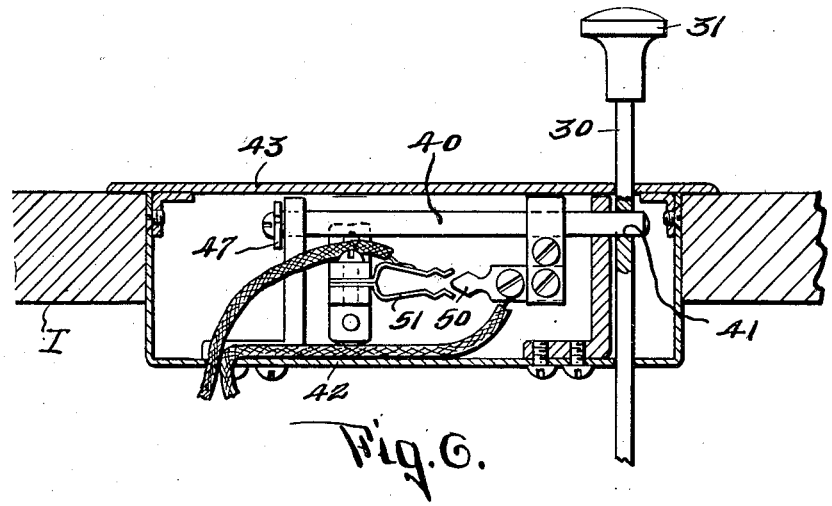
Figure 6 is a sectional view on line 6—6, Figure 5.

The bolt 40 may however be held in its unlocked position by the rod 30 provided the rod 30 is depressed before the push button 45 is released. The push button 49 and the arm 47 also have cam means 47$^a$ acting inclined plane fashion, whereby pushing in of the push button 49 thrusts the arm 47 to the right, Figure 5 and hence, returns the bolt 40 into its locked position provided of course, the operating rod 30 for the hood locking mechanism has been retracted to its original position. The depression of the push button 49 is also against the action of a suitable returning spring.

In operation, the operator first sets the right combination in the tumblers 46 and then presses the push button 45 thus moving the rod 44 to the left against the action of the spring 52 and shifting the bolt 40 to the left, the bolt 40 being held in its shifted position by the detent 48 acting on the end of the arm 47. The operator then depresses the knob 31 at the end of the push rod 30, thus withdrawing the locking bolts 10 for the hood and closing the switches 1 and 6 so that upon depressing of the usual starting switch or button of the automobile, the engine will start and continue to run.

When the push button 45 is released, it returns to its normal position.

To lock the hood and hence, make the parts thereunder inaccessible, the rod 30 is pulled outwardly to its original position and the push button 49 depressed, thus restoring the bolt 40 into interlocking engagement with the rod 30 and then the tumblers turned to upset the combination. In order to work on the engine or any parts under the hood when the engine is idle, the tumblers are operated to set the right combination and the push button 45 depressed and then the rod 30 depressed to unlock the hood locking bolts 10. The hood can then be raised and then the parts can be restored to their normal position while the hood is raised by depressing the push button 49.

Owing to the location of the switches in the starting and ignition circuits under the hood and the locking of the hood, it is practically impossible to start and run the engine or to wire around the switches controlling the starting and the ignition circuits and furthermore, owing to the location in the housing of the lock mechanism of a switch in the horn circuit, the horn can not be blown by meddlesome persons when the car is locked.

What I claim is:

1. The combination with a motor vehicle including the usual frame, instrument board, dash board, a hood enclosing the engine, and electric starting and ignition systems, the starting system having the usual operator operated starting switch therein, of normally closed auxiliary switches in the starting and ignition circuits, said switches being located in the hood, slidable locking bolts extending lengthwise of the sills of the frame under the hood and coacting with opposite sides of the hood to lock the hood closed, an arm extending from one of the slidable bolts and connected with one of the auxiliary switches for operating the same, a transverse rock shaft extending across the frame and connected with the sliding bolts for actuating the latter, a motion transmitting connection between the rock shaft and the other auxiliary switch, and an operating member for the rock shaft extending through the dash board.

2. The combination with a motor vehicle including the usual frame, instrument board, dash board, a hood enclosing the engine, and electric starting and ignition systems, the starting system having the usual operator operated starting switch therein, or normally closed auxiliary switches in the starting and ignition circuits, said switches being located in the hood, slidable locking bolts extending lengthwise of the sills of the frame under the hood and coacting with opposite sides of the hood to lock the hood closed, an arm extending from one of the slidable bolts and connected with one of the auxiliary switches for operating the same, a transverse rock shaft extending across the frame and connected with the slidable bolts and actuating the same, said rock shaft having intermediate depending and upwardly extending arms, a motion transmitting connection between one of the sliding bolts and one of the auxiliary switches, means for connecting the other auxiliary switch with the intermediate depending arm of the rock shaft, and an operating member connected with the upwardly extending arm of the rock shaft and extending through the dash board.

3. The combination with a motor vehicle including the usual frame, instrument board, dash board, a hood enclosing the engine, and electric starting and ignition systems, the starting system having the usual operator operated starting switch therein, or normally closed auxiliary switches in the starting and ignition circuits, said switches being located in the hood, slidable locking bolts extending lengthwise of the sills of the frame under the hood and coacting with opposite sides of the hood to lock the hood closed, an arm extending from one of the slidable bolts and connected with one of the auxiliary switches for operating the same, a transverse rock shaft extending across the frame and having terminal arms connected with the slidable bolts and actuating the same, slidable rods connected with the auxiliary switches, an arm extending from one of the said bolts and connected with the slidable rod of one of the auxiliary switches, an intermediate arm carried by the rock shaft and connected with the slidable rod of the other auxiliary switch, and an operating member for the rock shaft extending through the dash board.

4. The combination with a motor vehicle including the usual frame, instrument board, dashboard, hood enclosing the engine and an electric starting system having the usual starting switch therein and an ignition system, of normally closed auxiliary switches in the starting and ignition circuits, mechanism for locking the hood closed, a single operating member and connections between the operating member, the hood locking mechanism and the auxiliary switches.

5. The combination with a motor vehicle including the usual frame, instrument board, dashboard, hood enclosing the engine and an electric starting system having the usual starting switch therein and an ignition system, of normally closed auxiliary switches in the starting and ignition circuits, said switches being located under the hood, mechanism under the hood for locking the hood closed, a single operating member and connections between the operating member, the hood locking mechanism and the auxiliary switches and secret locking means for controlling the operation of the operating member.

6. The combination with a motor vehicle including the usual frame, instrument board, dashboard, hood enclosing the engine and an electric starting system having the usual starting switch therein and an ignition system, of normally closed auxiliary switches in the starting and ignition circuits, said switches being located under the hood, mechanism under the hood for locking the hood closed, a single operating member and connections between the operating member, the hood locking mechanism and the auxiliary switches and secret locking means for controlling the operation of the operating member, having a concealed locking bolt movable to and from the operating member and engaging the same between the ends thereof.

In testimony whereof, I have hereunto signed my name, at Syracuse, in the county of Onondago, and in the State of New York, this 27th day of August, 1928.

LOUIS L. CHESSMAN.